Sept. 22, 1959

A. SCHRENK 2,905,109

APPARATUS FOR THE PRODUCTION OF ALIMENTARY PASTE PRODUCTS

Filed March 18, 1955

INVENTOR
Alfred Schrenk
BY C. P. Goepel
his ATTORNEY

Sept. 22, 1959 A. SCHRENK 2,905,109
APPARATUS FOR THE PRODUCTION OF ALIMENTARY PASTE PRODUCTS
Filed March 18, 1955 2 Sheets-Sheet 2

INVENTOR
Alfred Schrenk
BY C. P. Goepel
his ATTORNEY

United States Patent Office 2,905,109
Patented Sept. 22, 1959

2,905,109

APPARATUS FOR THE PRODUCTION OF ALIMENTARY PASTE PRODUCTS

Alfred Schrenk, Uzwil, Switzerland, assignor to Gebrueder Buehler, Uzwil, Switzerland, a firm of Switzerland Application March 18, 1955, Serial No. 495,273

Claims priority, application Switzerland March 20, 1954

4 Claims. (Cl. 107—4)

This invention relates to an apparatus for the production of alimentary paste products, such as macaroni, spaghetti and the like.

In the manufacture of alimentary paste products, the dough is usually cooled while in the press, and the extruded products are then exposed to the surrounding atmosphere while being transported from the die toward and into the dryer by any suitable means, whereby they are cooled to the temperature of the air, only to be reheated in the drier. The alternating cooling and heating is detrimental to the products since they soften considerably with renewed increase in temperature. This effect is further intensified by surface condensation due to the humidity of the surrounding air. The softening of the extruded products causes deformations that detrimentally affect their appearance.

The heating of the products in the dryer also necessitates suitable apparatus and consumes considerable amounts of steam, electrical energy or other suitable heating medium.

Last but not least, considerable quantities of water must be added to the dough to retain its viscosity upon extrusion and exposure to the atmospheric air.

The present invention overcomes the above recited disadvantages of the prior apparatus by the provision that the dough be extruded directly into the dryer and that the dough be heated in advance of the extrusion step preferably to a temperature substantially corresponding to that required in the first drying step. In other words, the dough temperature during extrusion is preferably the same as that prevailing in the dryer compartment into which the extruded products are first introduced. As is known, the customary dryers for alimentary paste products comprise several compartments each provided with its own air conditioning system. Thus, the extrusion die is installed in the dryer together with the customary cutters and conveyors, and a heating device is preferably provided to raise the temperature of the dough in advance of the extrusion step to the temperature preferred in the first drying step.

A further marked advantage of the novel apparatus is in that substantial savings in calorific energy are achieved rendering its operation more economical, since the dough in the press need not be cooled and then heated again in the dryer, but is only heated, if necessary, to raise its temperature to the optimum required in the first drying step.

Still further, when the dough need not be reheated upon extrusion, less water must be added thereto as it is a known fact that the viscosity of the dough changes markedly with the temperature and consequently satisfactory viscosity may be obtained by using less water when the extrusion temperature is higher. Accordingly, the drying process is more economical since the amount of water to be evaporated from the extruded products is reduced.

The invention will be described in greater detail with reference to the accompanying drawings, in which.

Figure 1:
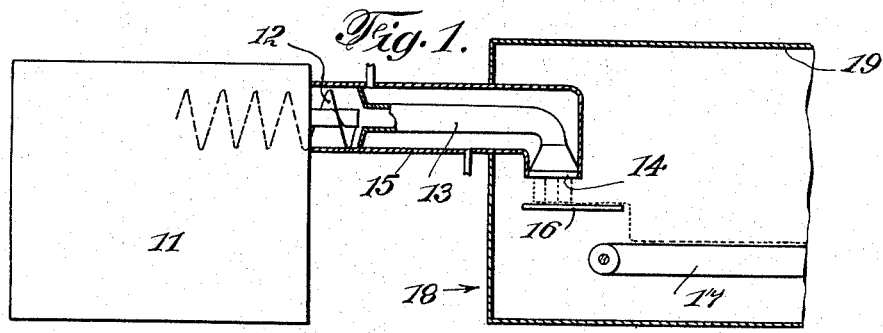
Fig. 1 is a schematic view illustrating a food press having its extrusion die provided inside the dryer at the end of a conduit which is surrounded by a heating element.

Referring now in more detail to the drawings, and more particularly to Fig. 1, there is shown schematically a food press 11 of any known design, having a worm 12 for conveying the dough into conduit 13 toward die 14 at the exit end of said conduit and inside the dryer 18. Conduit 13 is surrounded by a jacket 15 that may communicate with dryer 18 to permit circulation of hot air from the dryer and heat the dough in conduit 13 to a desired temperature. On the other hand, the dough may be heated by circulating hot water or steam inside jacket 15, or by an electric heater. The extruded products are cut to a desired length by a cutter 20, 120 or 220 (see Figs. 2, 3 and 4) and then processed in any suitable manner, such as by means of a shaker table 16 and a belt conveyor 17 or by means of a racking rod loading and processing apparatus 22 shown in Fig. 4. As seen, jacket 15 connects the press 11 directly with dryer 18 and the extrusion die together with the cutter and conveying apparatus is inside the dryer. In this manner, the dough is not exposed to the relatively cool outside air upon extrusion and either retains its temperature or is heated up in channel 13 prior to the extrusion thereof.

Figure 2:
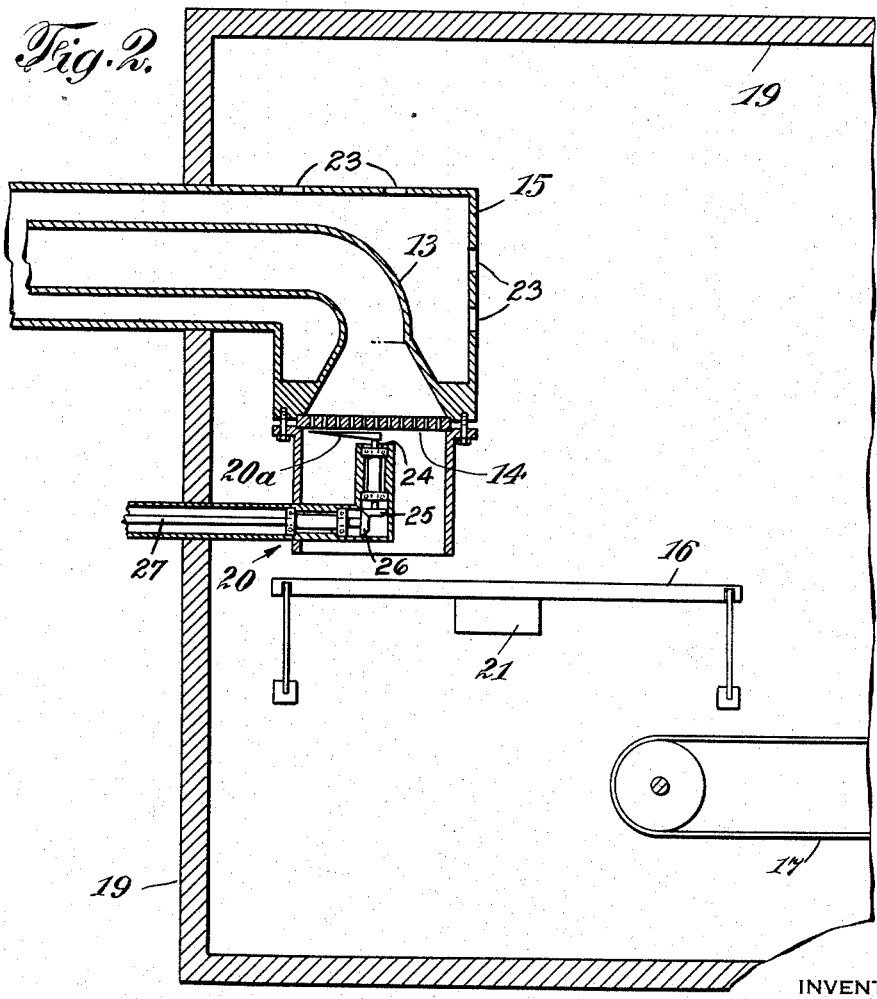
Fig. 2 is an enlarged sectional view of the extrusion die, associated cutting and conveying apparatus, and a portion of the dryer.

Fig. 2 illustrates a portion of the housing 19 of dryer 18 and shows a plurality of orifices 23 in the wall of jacket 15 for communication of hot air between the dryer and the jacket. A rotating knife 20a of the cutter 20 is driven from outside by any suitable means and at a rate preferably proportional to the extrusion speed to obtain products of a desired length. In the embodiment shown in this figure, the knife 20a is attached to the upper end of a vertical shaft 24 whose lower end carries a bevel gear 25. Gear 25 meshes with a bevel gear 26 rotated by a horizontal shaft 27 that extends from the housing 19 of the dryer 18. A shaker table 16 with a vibrator 21 and a customary belt conveyor 17 are shown somewhat schematically, as this invention is concerned neither with a particular apparatus for processing the extruded products, nor with any particular press, and also not with a particular cutter for the extruded products, but solely with an apparatus to prevent heat losses prior to and during extrusion. Table 16, by means of an electromagnetic vibrator 21 of known construction, for example, such as disclosed in U.S. Patent No. 2,737,129, granted March 6, 1956, causes the extruded and cut dough strings to move in a direction toward right and to drop onto the belt conveyor 17.

Figure 3:
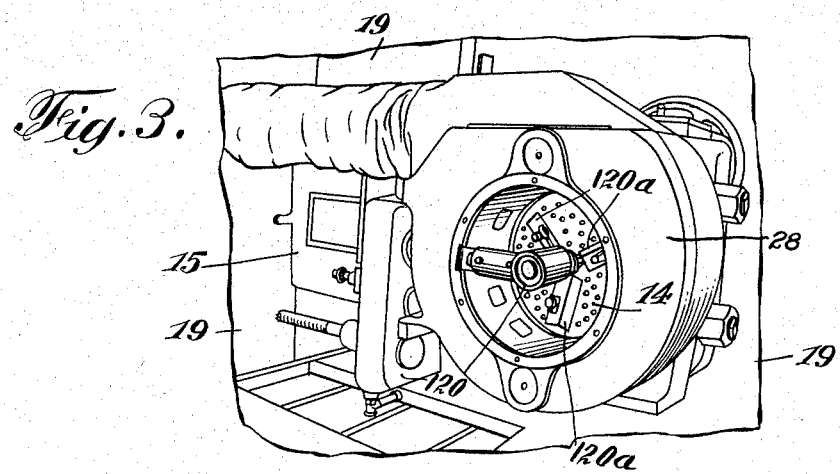
Fig. 3 is a perspective view of the die and a slightly modified cutting apparatus inside the dryer, as viewed from below.

A cutter 120 with three knives 120a is shown in Fig. 3 below die 14 in the housing 19 of dryer 18. A blower 28 of any suitable construction may be provided to cause a certain stiffening of the extruded and cut dough strings by removing a certain percentage of moisture therefrom.

Figure 4:
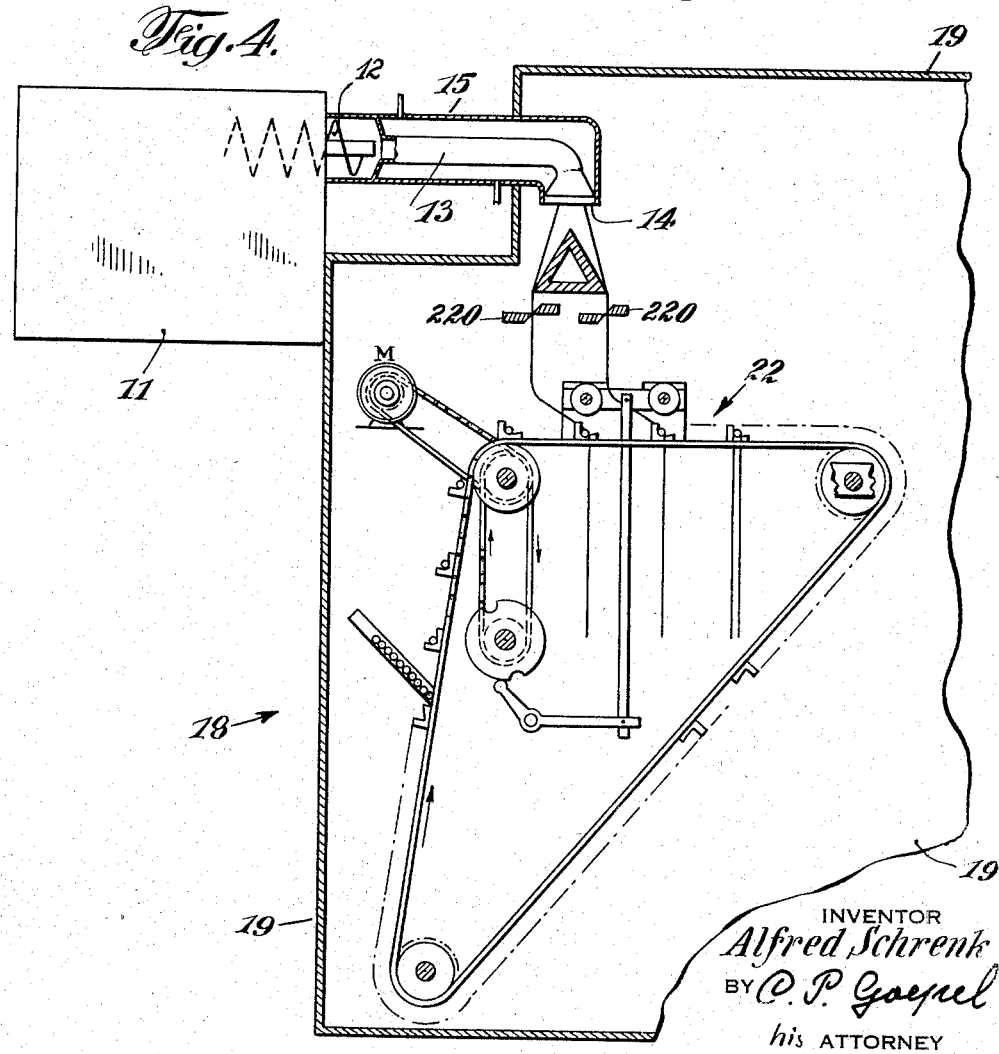
Fig. 4 is a view similar to that of Fig. 2 showing a racking rod loading and conveying mechanism inside the dryer.

Cutters 220 and the racking rod loading apparatus 22 shown in Fig. 4 are more fully described in U.S. Patent No. 2,800,088 to Alfred Leibundgut, granted July 23, 1957.

The heating jacket 15 may be omitted when the temperature conditions in the press are such that the dough, upon passage through conduit 13 and upon extrusion through die 14, will reach the dryer 18 with a temperature required in the first drying step. In this case, the walls of conduit 13 may be heat insulated to prevent losses during the passage of the dough.

While I have shown and described some at this time preferred embodiments of my invention, various changes and modifications may occur to a person skilled in the art by taking advantage of the novel method, and I therefore do not desire to be limited to the exact details shown but only by the scope of the appended claims.

I claim:

1. An apparatus for the production of alimentary paste products which comprises, in combination: a press for delivering an alimentary paste; conduit means connected to said press for receiving and conveying the paste and having a delivery end; an extrusion die at said delivery end for transforming the paste into a plurality of elongated paste products; a closed dryer surrounding said extrusion die and at least a portion of said conduit means whereby the paste products are extruded directly into said dryer; a heater surrounding said conduit means between said press and said dryer, said heater consisting of a jacket of heat insulating material in communication with said dryer; cutting means in said dryer for reducing the extruded paste products to desired length; and conveying means for transporting the extruded and cut paste products though said dryer.

2. An apparatus for the production of alimentary paste products which comprises, in combination: a press for delivering an alimentary paste; conduit means connected to said press for receiving and conveying the paste and having a delivery end; an extrusion die at said delivery end for transforming the paste into a plurality of elongated paste products; a closed dryer surrounding said extrusion die and at least a portion of said conduit means whereby the paste products are extruded directly into said dryer; means for maintaining the temperature of paste in said conduit means at a level not lower than the temperature prevailing in that zone of the dryer into which the extrusion die extends; cutting means in said dryer for reducing the extruded paste products to desired length; and conveying means for transporting the extruded and cut paste products though said dryer.

3. The apparatus as set forth in claim 2, wherein the means for maintaining the temperature of paste in said conduit means at a level not lower than the temperature prevailing in that zone of the dryer into which the extrusion die extends is a heater surrounding said conduit means at least between said press and said dryer.

4. The apparatus as set forth in claim 3, wherein said heater is a jacket filled with circulating fluid.

References Cited in the file of this patent

UNITED STATES PATENTS

| | | |
|---|---|---|
| 1,801,967 | Merlino | Apr. 21, 1931 |
| 2,074,458 | Cavagnaro | Mar. 23, 1937 |
| 2,208,900 | Giezendanner | July 23, 1940 |
| 2,583,847 | Hummel | Jan. 29, 1952 |
| 2,642,819 | Birdsall | June 23, 1953 |
| 2,669,195 | Pellegrino | Feb. 16, 1954 |

FOREIGN PATENTS

| | | |
|---|---|---|
| 554,776 | Great Britain | July 19, 1943 |